United States Patent
Fornage et al.

(10) Patent No.: US 7,986,122 B2
(45) Date of Patent: *Jul. 26, 2011

(54) METHOD AND APPARATUS FOR POWER CONVERSION WITH MAXIMUM POWER POINT TRACKING AND BURST MODE CAPABILITY

(75) Inventors: Martin Fornage, Petaluma, CA (US); Mudhafar Hassan-Ali, Petaluma, CA (US)

(73) Assignee: Enphase Energy, Inc., Petaluma, CA (US)

( * ) Notice: Subject to any disclaimer, the term of this patent is extended or adjusted under 35 U.S.C. 154(b) by 473 days.

This patent is subject to a terminal disclaimer.

(21) Appl. No.: 12/284,767

(22) Filed: Sep. 25, 2008

(65) Prior Publication Data

US 2009/0079383 A1    Mar. 26, 2009

Related U.S. Application Data

(60) Provisional application No. 60/995,409, filed on Sep. 26, 2007.

(51) Int. Cl.
  *H01M 10/44*    (2006.01)
  *H01M 10/46*    (2006.01)
(52) U.S. Cl. .................................. 320/101; 307/46
(58) Field of Classification Search .................. 320/101; 307/45, 46, 48; 136/243
  See application file for complete search history.

(56) References Cited

U.S. PATENT DOCUMENTS

| | | | |
|---|---|---|---|
| 4,375,662 A | 3/1983 | Baker | |
| 4,404,472 A | 9/1983 | Steigerwald | |
| 4,649,334 A | 3/1987 | Nakajima | |
| 5,604,430 A | 2/1997 | Decker et al. | |
| 6,320,769 B2 * | 11/2001 | Kurokami et al. | 363/56.03 |
| 6,351,400 B1 | 2/2002 | Lumsden | |
| 6,678,176 B2 | 1/2004 | Lumsden | |
| 6,809,942 B2 | 10/2004 | Madenokouji et al. | |
| 6,844,739 B2 | 1/2005 | Kasai et al. | |
| 6,919,714 B2 | 7/2005 | Delepaut | |
| 6,984,970 B2 | 1/2006 | Capel | |
| 7,053,506 B2 | 5/2006 | Alonso et al. | |
| 7,091,707 B2 | 8/2006 | Cutler | |
| 7,158,395 B2 | 1/2007 | Deng et al. | |
| 7,420,354 B2 | 9/2008 | Cutler | |
| 7,432,691 B2 | 10/2008 | Cutler | |

(Continued)

OTHER PUBLICATIONS

Jantsch, M. & Verhoeve, C. W. G. "AC PV Module Inverters With Full Sine Wave Burst Operation Mode for Improved Efficiency of Grid Connected Systems at Low Irradiance," downloaded from the Internet, ftp://ftp.ecn.nl.pub/www/library/conf/14epsec/burstmod.pdf, on Jan. 28, 2009.

(Continued)

*Primary Examiner* — Edward Tso
*Assistant Examiner* — Ramy Ramadan
(74) *Attorney, Agent, or Firm* — Moser Taboada

(57) ABSTRACT

An apparatus and method for converting a DC input power to a DC output power. The apparatus comprises an energy storage module and a burst mode controller. The burst mode controller causes energy to be stored in the energy storage module during at least one storage period, and further causes the energy to be drawn from the energy storage module during at least one burst period. During the at least one burst period, the DC output power is greater than the DC input power. Additionally, the burst mode controller employs a maximum power point tracking (MPPT) technique for operating a device providing the DC input power proximate a maximum power point (MPP).

20 Claims, 6 Drawing Sheets

U.S. PATENT DOCUMENTS

| | | | |
|---|---|---|---|
| 7,456,604 B2 * | 11/2008 | Kurokami et al. | 320/101 |
| 7,479,774 B2 * | 1/2009 | Wai et al. | 323/284 |
| 2004/0207366 A1 | 10/2004 | Sung | |
| 2004/0264225 A1 | 12/2004 | Bhavaraju et al. | |
| 2005/0254191 A1 | 11/2005 | Bashaw et al. | |
| 2006/0174939 A1 * | 8/2006 | Matan | 136/293 |
| 2007/0159866 A1 | 7/2007 | Siri | |
| 2007/0221267 A1 | 9/2007 | Fornage | |
| 2008/0111517 A1 | 5/2008 | Pfeifer et al. | |
| 2008/0143188 A1 | 6/2008 | Adest et al. | |
| 2008/0183338 A1 | 7/2008 | Kimball et al. | |
| 2008/0290252 A1 | 11/2008 | Leonhardt et al. | |

OTHER PUBLICATIONS

International Search Report and Written Opinion mailed May 26, 2010 for PCT Application No. PCT/US2009/060148.

"Inverters, Converters, Controllers and Interconnection System Equipment for Use With Distributed Energy Resources," Underwriters Laboratories Inc., UL Standard 1741.1, May 7, 1999, downloaded from web site http://ulstandardsinfonet.ul.com/scopes/1741.html on Jun. 12, 2009.

"IEEE Recommended Practice for Utility Interface of Photovoltaic (PV) Systems," IEEE Std 929-2000, Approved Jan. 30, 2000, Copyright 2000 IEEE.

Bower, Ward et al., "Performance Test Protocol for Evaluating Inverters Used in Grid-Connected Photovoltaic Systems," Draft Oct. 2004.

Esram, T. and Chapman, P. L., "Comparison of Photovoltaic Array Maximum Power Point Tracking Techniques," Trans. Energy Conversion, vol. 22, No. 2, Jun. 2007.

Bower, Ward Issac, "The AC PV Building Block Ultimate Plug-n-Play That Brings Photovoltaics Directly to the Customer," U.S. Department of Energy Contract DE-AC04-94AL85000, published Feb. 1, 2003, pp. 1-4.

Bower, Ward I. et al., "Innovative Micro-Inverter for the AC PV Building Block or AC Modules," Copyright 2005 by ASME.

* cited by examiner

METHOD AND APPARATUS FOR POWER CONVERSION WITH MAXIMUM POWER POINT TRACKING AND BURST MODE CAPABILITY

CROSS-REFERENCE TO RELATED APPLICATIONS

This application claims benefit of U.S. provisional patent application Ser. No. 60/995,409, filed Sep. 26, 2007, which is herein incorporated by reference.

BACKGROUND OF THE INVENTION

1. Field of the Invention

Embodiments of the present disclosure generally relate to power conversion, and, more particularly, to a method and apparatus for power conversion with maximum power point tracking and burst mode capability.

2. Description of the Related Art

Solar panels have historically been deployed in mostly remote applications, such as remote cabins in the wilderness or satellites, where commercial power was not available. Due to the high cost of installation, solar panels were not an economical choice for generating power unless no other power options were available. However, the worldwide growth of energy demand is leading to a durable increase in energy cost. In addition, it is now well established that the fossil energy reserves currently being used to generate electricity are rapidly being depleted. These growing impediments to conventional commercial power generation make solar panels a more attractive option to pursue.

Solar panels, or photovoltaic (PV) modules, convert energy from sunlight received into direct current (DC). The PV modules cannot store the electrical energy they produce, so the energy must either be dispersed to an energy storage system, such as a battery or pumped hydroelectricity storage, or dispersed by a load. One option to use the energy produced is to employ one or more inverters to convert the DC current into an alternating current (AC) and couple the AC current to the commercial power grid. The power produced by such a distributed generation (DG) system can then be sold to the commercial power company.

PV modules have a nonlinear relationship between the current (I) and voltage (V) that they produce. A maximum power point (MPP) on an I-V curve for a PV module identifies the optimal operating point of the PV module; when operating at this point, the PV module generates the maximum possible output power for a given temperature and solar irradiance. Therefore, in order to optimize power drawn from a PV module, a power conversion device coupled to the PV module, such as an inverter, generally employs a maximum power point tracking (MPPT) technique to ensure that the PV module is operated at the current and voltage levels corresponding to its MPP. The MPPT acts to rapidly adjust the PV module operating current and voltage levels in response to changes in solar irradiance and/or temperature such that the PV module can continue to operate at the MPP.

During the time period required for an MPPT technique to bias a PV module to its MPP, for example, when the solar irradiance on a PV module changes from no irradiance to increasing irradiance, a power conversion device coupled to the PV module will suffer from a lower efficiency until the MPP is achieved. Additionally, a power conversion device coupled to a PV module generally will suffer from a lower efficiency when the PV module is operating at a low power, i.e., low irradiance. During low irradiance, a PV module and an associated inverter may operate so inefficiently that is it best for overall system efficiency to deactivate the PV module and/or its inverter until solar irradiance increases.

Therefore, there is a need in the art for a method and apparatus for improving operation of a PV module and inverter during low irradiance.

SUMMARY OF THE INVENTION

Embodiments of the present invention generally relate to a method and apparatus for converting a DC input power to a DC output power. The apparatus comprises an energy storage module and a burst mode controller. The burst mode controller causes energy to be stored in the energy storage module during at least one storage period, and further causes the energy to be drawn from the energy storage module during at least one burst period. During the at least one burst period, the DC output power is greater than the DC input power. Additionally, the burst mode controller employs a maximum power point tracking (MPPT) technique for operating a device providing the DC input power proximate a maximum power point (MPP).

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Figure 1:
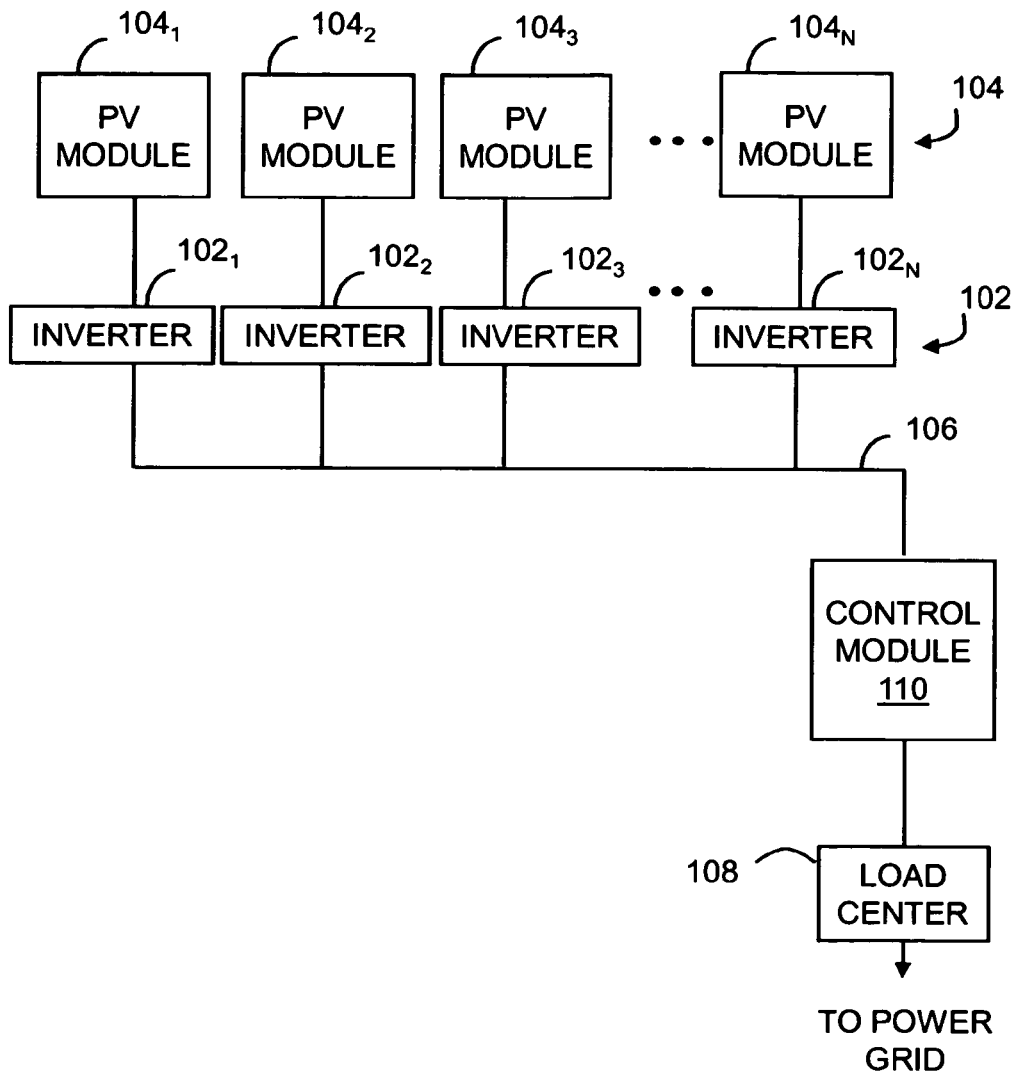
FIG. 1 is a block diagram of a system for distributed generation (DG) in accordance with one or more embodiments of the present invention.

FIG. 1 is a block diagram of a system 100 for distributed generation (DG) in accordance with one or more embodiments of the present invention. This diagram only portrays one variation of the myriad of possible system configurations. The present invention can function in a variety of distributed power generation environments and systems.

The system 100 comprises a plurality of inverters $102_1$, $102_2$ ... $102_n$, collectively referred to as inverters 102, a plurality of PV modules $104_1$, $104_2$ ... $104n$, collectively referred to as PV modules 104, an AC bus 106, a load center 108, and an array control module 110. Each inverter $102_1$, $102_2$ ... $102_n$ is coupled to a $P_V$ module $104_1$, $1_04_2$ ... $104_n$, respectively. In some embodiments, a DC-DC converter may be coupled between each $P_V$ module 104 and each inverter 102 (i.e., one converter per PV module 104). Alternatively, multiple PV modules 104 may be coupled to a single inverter 102; in some embodiments, a DC-DC converter may be coupled between the PV modules 104 and the single inverter 102.

Each inverter 102 employs an MPPT technique to operate the subtending PV module 104 at its MPP such that the PV module 104 generates an optimal power output for a given temperature and solar irradiation. The inverters 102 are further coupled to the AC bus 106, which in turn is coupled to the load center 108. The load center 108 houses connections between incoming power lines from a commercial power grid distribution system and the AC bus 106. The inverters 102 convert DC power generated by the PV modules 104 into AC power, and meter out AC current that is in-phase with the AC commercial power grid voltage. The system 100 couples the generated AC power to the commercial power grid via the load center 108.

A control module 110 is coupled to the AC bus 106. The control module 110 is capable of issuing command and control signals to the inverters 102 in order to control the functionality of the inverters 102.

In accordance with one or more embodiments of the present invention, the inverters 102 employ a "burst mode" during initial operation and during periods of low power output from the PV modules 104. In burst mode, the inverters 102 store energy over one or more commercial power grid cycles, and, upon sufficient energy being stored, "burst" the stored energy to the commercial power grid. In addition to improving the efficiency of the inverters 102, the burst mode facilitates a rapid convergence to the MPP by an MPPT technique described below. Upon reaching the MPP, and if the PV modules 104 are supplying sufficient output power, the inverters 102 switch from the burst mode to a steady-state mode, utilizing the MPPT technique to remain at the MPP. In the event that the solar irradiance and/or temperature changes to a level that cannot sustain MPPT operation, one or more of the inverters 102 switch back to burst mode.

Figure 2:
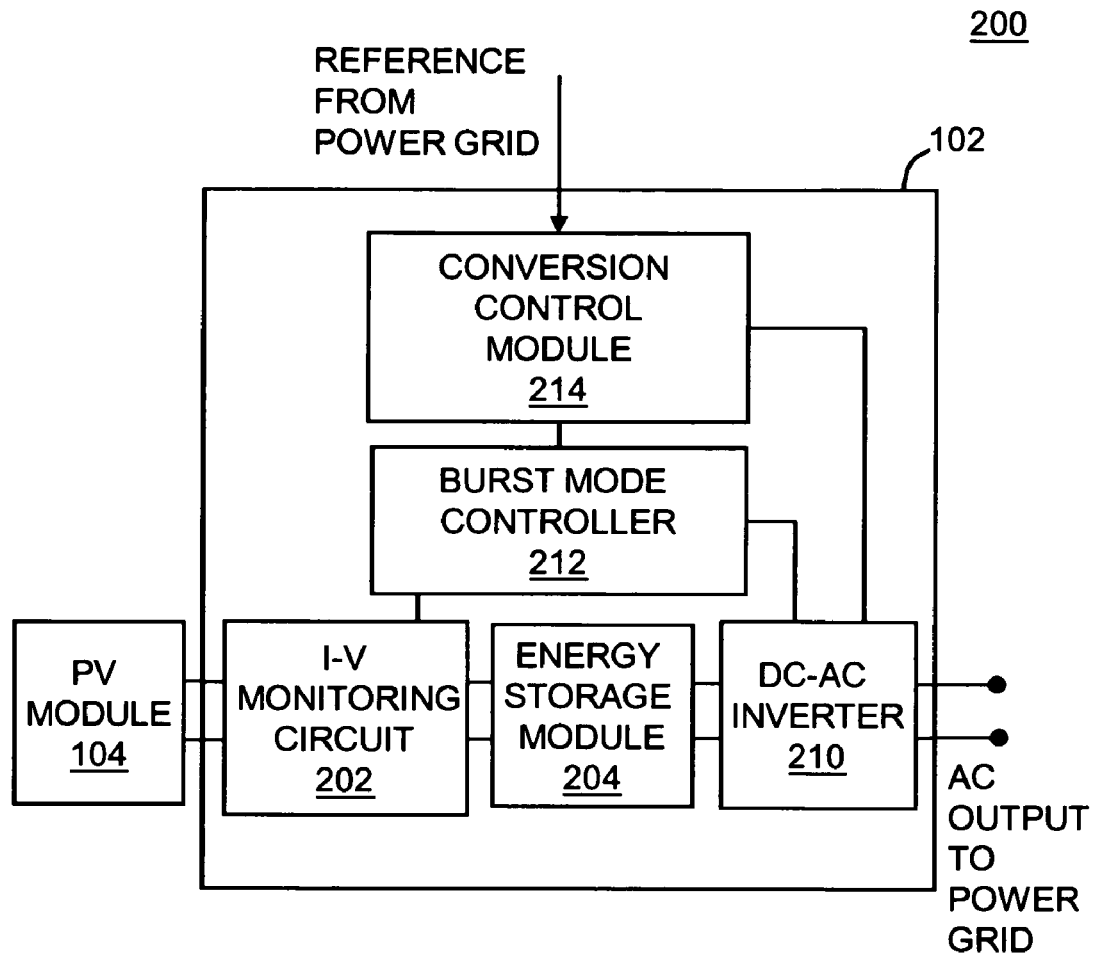
FIG. 2 is a block diagram of an inverter in accordance with one or more embodiments of the present invention.

FIG. 2 is a block diagram of an inverter 102 in accordance with one or more embodiments of the present invention. The inverter 102 comprises an I-V monitoring circuit 202, an energy storage module 204, a DC-AC inverter 210, a burst mode controller 212, and a conversion control module 214. The inverter 102 is coupled to the PV module 104 and to the commercial power grid. In some embodiments, a DC-DC converter may be coupled between the PV module 104 and the inverter 102.

The I-V monitoring circuit 202 is coupled to the burst mode controller 212, across two output terminals of the PV module 104, and across two terminals of the energy storage module 204; the energy storage module 204 is further coupled across two terminals of the DC-AC inverter 210. The burst mode controller 212 is further coupled to the conversion control module 214 and to the DC-AC inverter 210.

The I-V monitoring circuit 202 monitors the instantaneous voltage and current output levels, $V_{PV}$ and $I_{PV}$, respectively, from the PV module 104, and provides a signal indicative of such current and voltage information to the burst mode controller 212. The burst mode controller 212 utilizes the current and voltage information from the I-V monitoring circuit 202 to switch the inverter 102 between continuous mode and burst mode. During burst mode, the burst mode controller 212 drives the inverter 102 such that energy generated by the PV module 104 is stored in the energy storage module 204 during energy storage periods, and the stored energy is dispensed to the DC-AC inverter 210 during burst periods. Such dispensed energy acts to produce a higher output power from the DC-AC inverter 210 than that which would be achievable utilizing the PV module 104 instantaneous output power alone and thereby increase the inverter efficiency. In some embodiments, the energy storage module 204 comprises a capacitor.

In addition to being coupled to the energy storage module 204 and the burst mode controller 212, the DC-AC inverter 210 is coupled to the conversion control module 214. The conversion control module 214 receives a reference signal input from the commercial power grid, and provides the control signals for the DC-AC inverter 210 to convert DC power received through the I-V monitoring circuit 202 and energy storage module 204 to AC power. Commonly assigned U.S. Patent Application Publication No. 2007/0221267 entitled "Method and Apparatus for Converting Direct Current to Alternating Current" and filed Sep. 27, 2007, which is herein incorporated in its entirety by reference, discloses an example of such power conversion. The resulting output current from the inverter 102 is coupled to the commercial power grid such that it is in-phase with the commercial AC current.

Upon initial operation or being unable to operate at the MPP, the inverter 102 operates in burst mode, wherein during an energy storage period (e.g., one or more AC grid waveform cycles of 16.67 msec) the energy storage module 204 stores energy that is subsequently sent to the DC-AC inverter 210 during a burst period (i.e., once significant energy has been stored). The burst mode controller 212 drives the inverter 102 during burst mode to achieve such energy storage and utilization. During energy storage periods, the burst mode controller 212 drives the inverter 102 such that no output current is produced. As a result, current generated by the PV module 104 is prohibited from flowing to the DC-AC inverter 210 and the resulting energy is stored in the energy storage module 204; in some embodiments, the energy storage module 204 comprises a capacitor, and the current generated by the PV module 104 charges the capacitor during the energy storage period.

During a burst period, the burst mode controller 212 drives the inverter 102 to generate a burst current, $I_B$, where $I_B$ is greater than the normal output current generated by the inverter 102 during a steady state (i.e., non-burst) operating mode. The current $I_B$ results in an output power from the inverter 102 greater than the input power supplied by the PV module 104 alone. The energy stored in the energy storage module 204 compensates for the power deficit from the PV module 104, and the coupling of energy to the DC-AC inverter 210 results in a voltage drop across the energy storage module 204 and a corresponding voltage drop across the PV module 104. When the voltage across the energy storage module 204, and hence the voltage across the PV module 104, drops below a threshold, the burst mode controller 212 drives the inverter 102 such that no output current is produced (i.e., an energy storage period), and energy from the PV module 104 is again stored in the energy storage module 204 until such time that sufficient energy is available to generate another burst.

In addition to improving the efficiency of the inverter 102 during periods of low PV module output power, the burst mode facilitates a rapid convergence to the MPP. For a given solar irradiance and temperature, a Power-Voltage (P-V) curve depicts output power from a PV module, such as the PV module 104, as a function of the PV module operating voltage. Generally, for a PV module 104 employed as in the system 100, the P-V curve will have a single peak identifying the maximum possible PV module output power and the corresponding operating voltage (i.e., the MPP). As such, the slope of the P-V curve, $\Delta P/\Delta V$, to the left of the MPP (i.e., in the left-plane of the P-V curve) has a positive value that decreases in magnitude until it reaches zero at the MPP; moving to the right of the MPP (i.e., the right-plane of the P-V curve), $\Delta P/\Delta V$ has a negative increasing value. Thus, by knowing the slope of the P-V curve at a particular operating voltage, it can be determined whether the operating voltage should be increased or decreased to move toward the MPP. By utilizing the burst mode, resulting changes to the PV module output power and operating voltage, as described below, provide an opportunity to monitor the $\Delta P/\Delta V$ and suitably adjust the output current of the inverter 102 to drive the PV module 104 to the MPP.

Upon reaching the MPP, and if the PV module output power is at a sufficient level, the burst mode is discontinued and the inverter 102 operates in a steady-state, or continuous, mode. When operating in continuous mode, the burst mode controller 212 drives the inverter 102 to produce a required output current, $I_{req}$. A ripple voltage present across the energy storage module 204 provides a small voltage "sweeping" such that the $\Delta P/\Delta V$ can continue to be monitored and $I_{req}$ adjusted according to continue operating the PV module 104 at the MPP.

Figure 3:
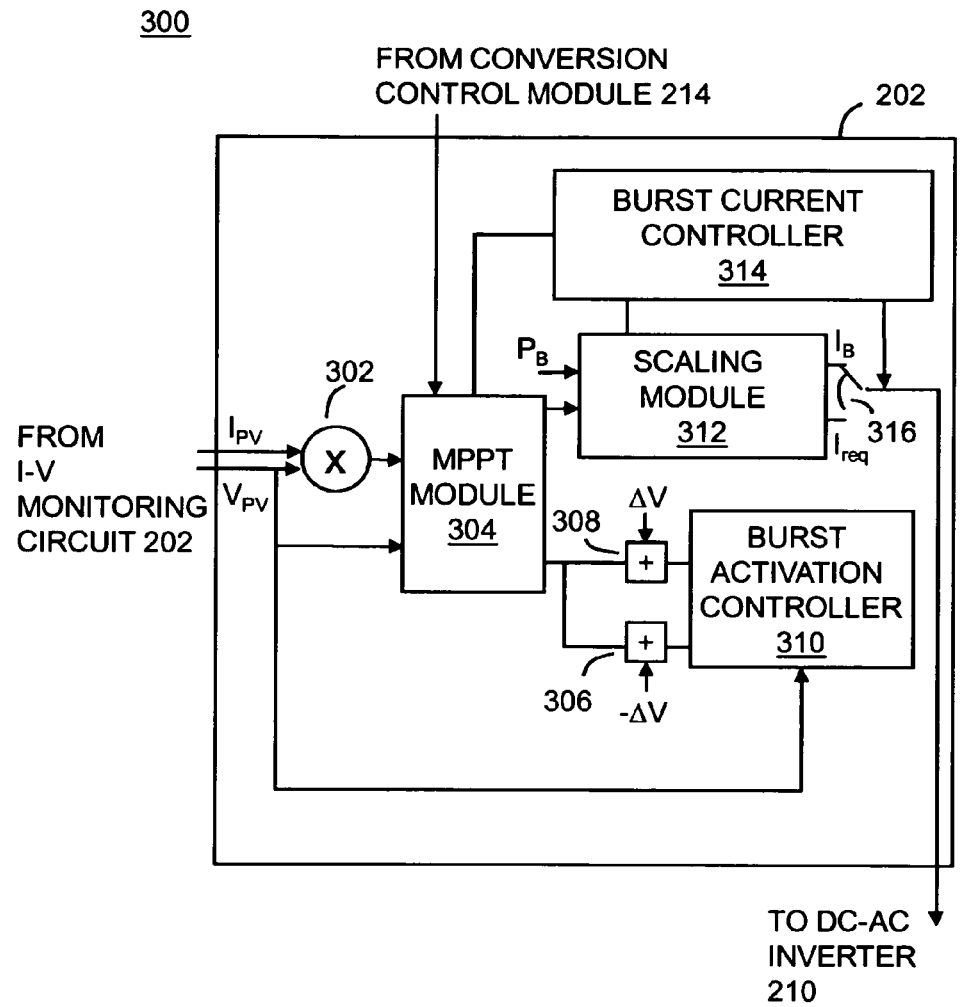
FIG. 3 is a block diagram of a burst mode controller in accordance with one or more embodiments of the present invention.

FIG. 3 is a block diagram of a burst mode controller 212 in accordance with one or more embodiments of the present invention. The burst mode controller 212 comprises a multiplier 302, an MPPT module 304, two adders 306 and 308, a burst activation controller 310, a scaling module 312, a burst current controller 314, and a switch module 316.

The multiplier 302 is coupled to the I-V monitoring circuit 202 such that it receives a sampling of the PV module instantaneous output voltage and current, $V_{PV}$ and $I_{PV}$ respectively, from the I-V monitoring circuit 202. The resulting output of the multiplier 302 provides a measure of the instantaneous power generated by the PV module 104, $P_{PV}$, and is coupled to the MPPT module 304. Additionally, the MPPT module 304 is coupled to the I-V monitoring circuit 202 and receives a signal indicative of the PV module instantaneous output voltage $V_{PV}$. The MPPT module 304 receives an input signal indicative of the commercial power grid cycle from the conversion control module 214, for example from a phase lock loop of the conversion control module 214, and is further coupled to the scaling module 312, the burst current controller 314, and each of the adders 306 and 308.

During each cycle of the commercial power grid, the MPPT module 304 computes the change in PV module output power with respect to the change in PV module operating voltage, $\Delta P/\Delta V$. For example, for a 60 Hz commercial power grid, the MPPT module 304 computes the $\Delta P/\Delta V$ during each 16.67 msec cycle of the commercial power grid. Based on the computed $\Delta P/\Delta V$, the MPPT module 304 determines a required adjustment to the PV module operating voltage in order to approach the MPP and the corresponding desired PV module operating voltage. In the case where $\Delta P/\Delta V$ is greater than zero, i.e., the operating voltage is in the left-plane of the P-V curve, the operating voltage must be increased to reach the MPP; if $\Delta P/\Delta V$ is less than zero, i.e., the operating voltage is in the right-plane of the P-V curve, the operating voltage must be decreased. Additionally, as the operating voltage approaches the MPP voltage and the magnitude of $\Delta P/\Delta V$ can be seen to decrease, smaller adjustments can be made to the operating voltage to ensure a graceful convergence to the MPP voltage.

The MPPT module 304 provides a signal indicative of the new desired PV module operating voltage to the scaling module 312 and to each of the adders 306 and 308. A small positive voltage, $+\Delta V$, is provided as an input to the adder 308; the resulting output is a high voltage threshold, $V_H$. A small negative voltage $-\Delta V$, is provided as an input to the adder 306; the resulting output is a low voltage threshold, $V_L$. In some embodiments, $+\Delta V$ and $-\Delta V$ are of the same magnitude; in alternative embodiments, they may have different magnitudes. The outputs of the adders 306 and 308 are each coupled to the burst activation controller 310. Additionally, the burst activation controller 310 is coupled to the I-V monitoring circuit 202 such that it receives the instantaneous PV module operating voltage $V_{PV}$. During burst mode, the burst activation controller 310 utilizes the $V_{PV}$, $V_H$, and $V_L$ information, as described below, to switch between energy storage and burst periods.

In addition to receiving the desired PV module operating voltage from the MPPT module 304, the scaling module 312 receives an input of a burst power level, $P_B$. Two output terminals of the scaling module 312 are coupled to the switch module 316, and the switch module 316 is further coupled to the burst current controller 314 and to the DC-AC inverter 210. When the PV module output power is greater than a burst mode threshold level, the inverter 102 operates in continuous mode and the burst current controller 314 drives the switch module 316 to select the output from a second output terminal of the scaling module 312 for driving the DC-AC inverter 210 to generate a continuous mode output current, $I_{req}$. The scaling module 312 receives an input indicative of the average PV module operating voltage and the desired PV module operating voltage from the MPPT module 304. Based on the error between the average PV module operating voltage and the desired PV module operating voltage, the scaling module 312 determines the required inverter output current $I_{req}$ that will result in biasing the PV module 104 at the desired operating voltage.

When the PV module output power is lower than the burst mode threshold level, the inverter 102 operates in burst mode, and the burst current controller 314 drives the switch module 316 to select the output from a first output terminal of the scaling module 312 for driving the DC-AC inverter 210 to generate a burst current, $I_B$. During energy storage periods, the burst activation controller 310 drives the scaling module such that $I_B$ is set to zero; as a result, the inverter 102 produces no output power and energy generated by the PV module 104 is stored in the energy storage module 204. Such energy storage results in a rising voltage across the energy storage module 204 and a corresponding rising PV module voltage, $V_{PV}$. During each cycle of the commercial power grid, the burst activation controller 310 compares the instantaneous PV module operating voltage $V_{PV}$ to the high and low voltage thresholds, $V_H$ and $V_L$, computed during the previous grid cycle. If $V_{PV}$ exceeds $V_H$, sufficient energy has been stored in the energy storage module 204 to generate a burst. The burst activation controller 310 then drives the scaling module 312 to set $I_B$ to a maximum value such that stored energy is drawn from the energy storage module 204.

During the burst period, the burst activation controller 310 drives the scaling module such that $I_B$ is set to a maximum value. In order to generate the current $I_B$, the DC-AC inverter 102 draws the stored energy from the energy storage module 204, resulting in a voltage drop across the energy storage module 204 and a corresponding voltage drop in the PV module voltage $V_{PV}$. When the burst activation controller 310 detects that $V_{PV}$, and therefore the voltage across the energy storage module 204, is below $V_L$, sufficient energy has been drawn from the energy storage module 204 to necessitate an energy storage period. The burst activation controller 310 then drives the scaling module 312 to set $I_B$ to zero, thereby prohibiting current from flowing to the DC-AC inverter 210 and allowing the energy generated by the PV module 104 to again be stored in the storage module 202.

The energy storage and burst periods during burst mode allow sufficient energy to be stored in and drawn from the energy storage module 204 to provide a "burst" of additional power to the DC-AC inverter 210, thereby improving the efficiency of the inverter 102 during periods when the PV module 104 is operating at a low power level. Additionally, during burst mode the PV module voltage $V_{PV}$ "swings" between $V_L$ and $V_H$, causing the PV module output power to change accordingly and allowing the burst mode controller 212 to monitor the $\Delta P/\Delta V$ and suitably adjust the PV module operating voltage for efficient MPPT operation. Once the MPP voltage has been reached, the inverter 102 can switch from burst mode to continuous mode, or, if the PV module output power remains below the burst mode threshold, the inverter 102 can remain in burst mode.

During continuous mode operation, the selected output from the scaling module 312 drives the DC-AC inverter 210 to generate the continuous mode output current $I_{req}$. A ripple voltage present across the energy storage module 204 results in a small voltage swing in the PV module operating voltage $V_{PV}$. This small voltage swing and the corresponding change in the PV module output power allows the MPPT module 304 to continue to compute the $\Delta P/\Delta V$ and generate the required PV module operating voltage adjustments to maintain operation at the MPP.

Figure 4:
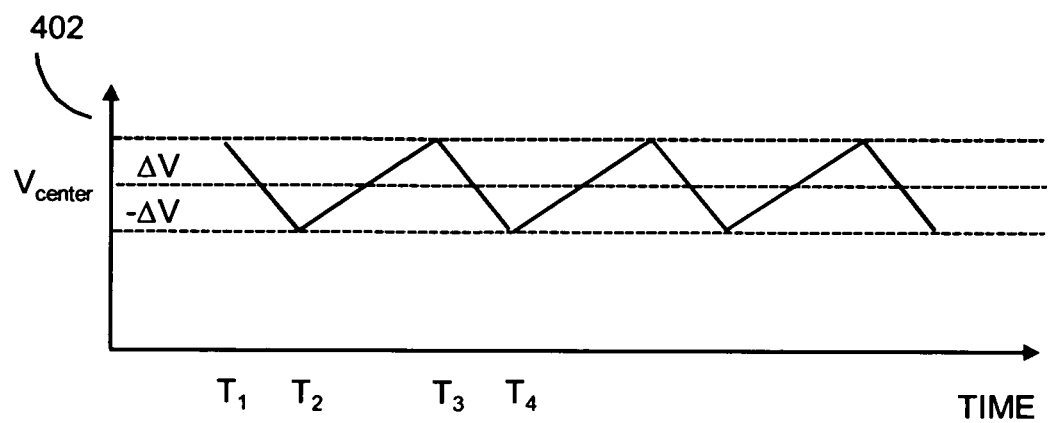
FIG. 4 is a pair of graphical diagrams for determining a voltage swing range in accordance with one or more embodiments of the present invention.
Figure 4:
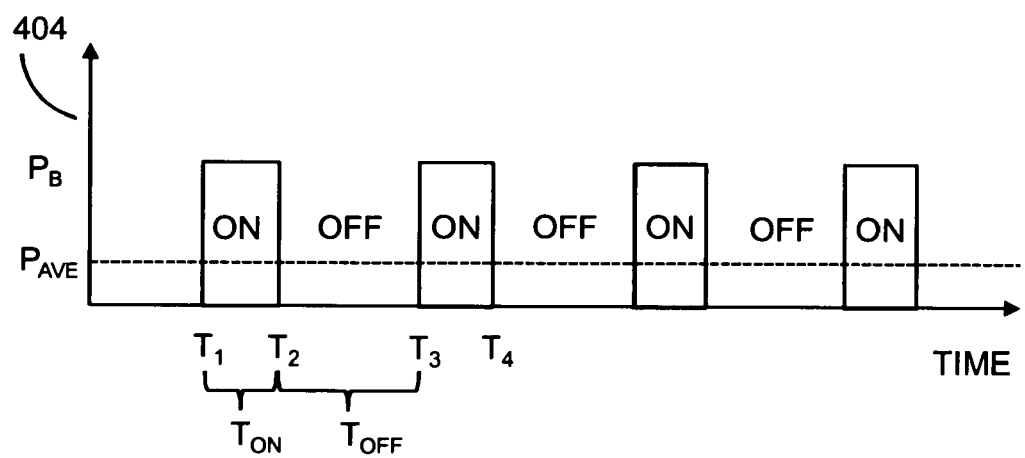

FIG. 4 is a pair of graphical diagrams 402 and 404 for determining a voltage swing range in accordance with one or more embodiments of the present invention. The graphs 402 and 404 depict a voltage level across the energy storage module 204 and a corresponding output power level of the inverter 102, respectively, during burst mode.

From time $T_1$ to $T_2$, the inverter 102 operates during an energy storage period, allowing the energy storage module 204 to charge and resulting in the rising voltage level across the energy storage module 204, as depicted in graph 402. During the energy storage period, no input power is provided to the DC-AC inverter 210, and the corresponding output power level of the inverter 102 from time $T_1$ to $T_2$ can be seen to be zero.

At time $T_2$, the energy stored in the energy storage module 204 has reached a level sufficient to trigger a burst period. During the burst period, the inverter 102 is driven to generate a burst mode output power level $P_B$, as depicted in graph 404. As energy is drawn from the energy storage module 204 in order to achieve $P_B$, the voltage level across the energy storage module 204 drops, as depicted in graph 402. At time $T_3$, the voltage level across the energy storage module 204 drops to a level sufficient to necessitate an energy storage period, and the output power level of the inverter 102 drops to zero as the energy storage period begins.

During burst mode, as the inverter 102 alternates between energy storage and burst periods, the voltage level across the energy storage module 204 can be seen to "swing" by a small amount, $\Delta V$, around a center voltage of $V_{center}$. When the voltage across the energy storage module 204 becomes greater than $V_{center}+\Delta V$, the inverter 102 generates a burst and produces an output power that is coupled to the commercial power grid. When the voltage across the energy storage module 204 drops below $V_{center}-\Delta V$, the inverter 102 begins an energy storage period and produces no output power. Thus, the value of $\Delta V$ determines when the inverter 102 is in a burst period or an energy storage period, and thereby determines when output power from the inverter 102 is coupled to the commercial power grid.

In some embodiments, the voltage swing around the center voltage $V_{center}$ may be determined as follows. Utilizing a known average voltage across the energy storage module 204, $V_{center}$, and a known average burst power, $P_B$, the time from $T_2$ to $T_3$, or $T_{on}$, can be estimated as follows based on $V_{center} \gg \Delta V \gg$ ripple voltage across the energy storage module 204 and $+\Delta V$ having the same magnitude as $-\Delta V$:

$$(P_B - P_{Avg})T_{On} = \frac{1}{2}C((V_{Center} + \Delta)^2 - (V_{Center} - \Delta)^2) \approx 2C\Delta V_{center}^2$$

where C is the capacitance of the energy storage module 204. Therefore, $T_{on}$ can be shown as:

$$T_{On} = 2C\frac{\Delta V_{center}^2}{P_B - P_{Avg}}$$

In order to efficiently coupled power produced by the inverter 102 to the commercial power grid, $T_{on}$ must be an integer number "n" grid cycles; in some embodiments, $T_{on}$ must therefore be equal to 16.67 n msec. The voltage swing required to achieve such a $T_{on}$ can be determined as follows:

$$T_{On} = 2C\frac{\Delta V_{center}^2}{P_B - P_{Avg}} = nT = 16.7n \text{ msec}$$

$$\Delta V_{Center} = \sqrt{\frac{16.67n(P_B - P_{Avg})}{2C}}$$

Figure 5:
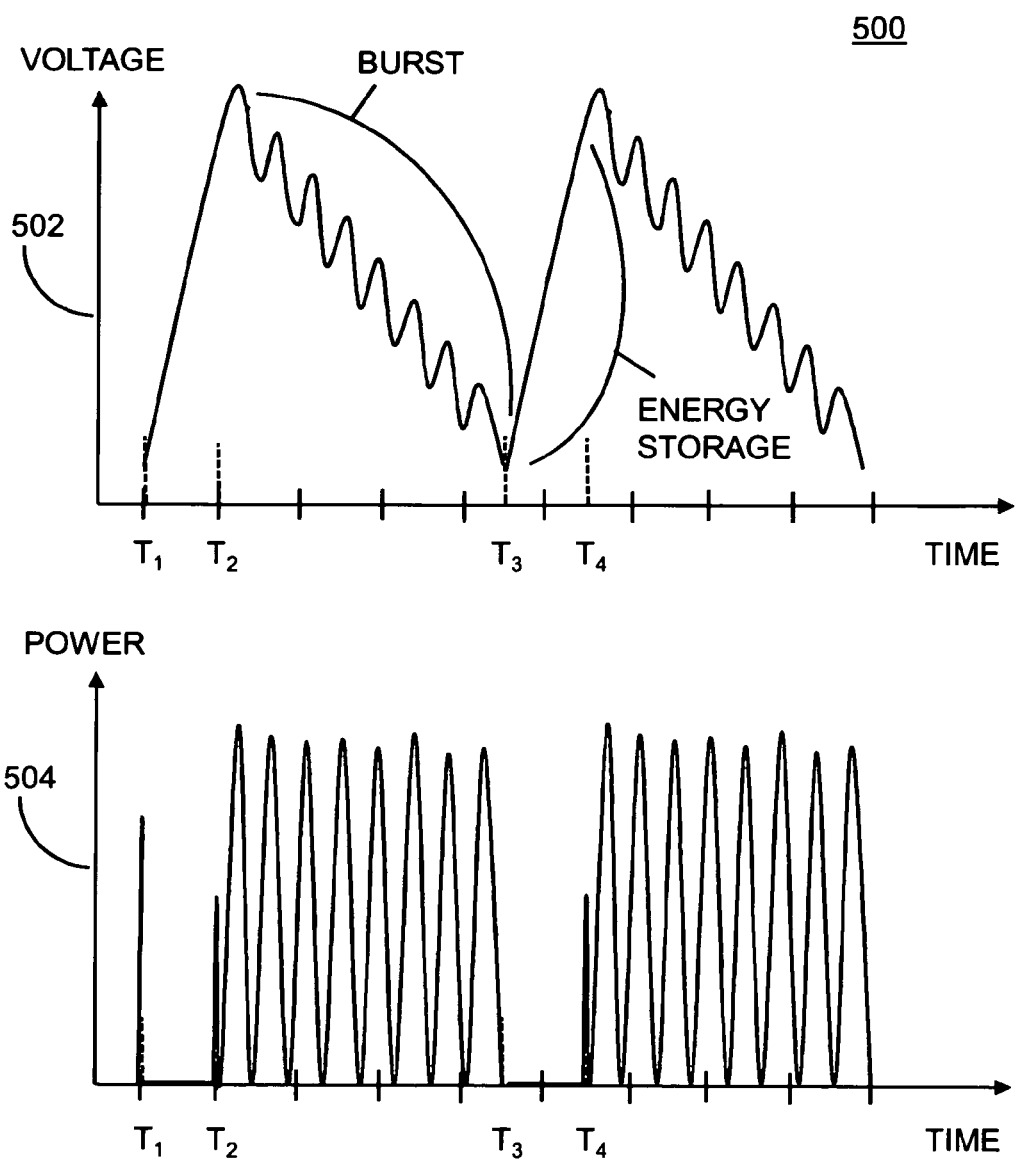
FIG. 5 is a pair of graphical diagrams showing simulated results of voltage and power levels in accordance with one or more embodiments of the present invention.

FIG. 5 is a pair of graphical diagrams 502 and 504 showing simulated results of voltage and power levels in accordance with one or more embodiments of the present invention. The graph 502 depicts the simulated voltage level across the energy storage module 204 during burst mode, and the graph 504 depicts the simulated corresponding output power of the inverter 102.

From time $T_1$ to $T_2$, the inverter 102 is in an energy storage period. The burst current $I_B$ is set to zero, allowing the energy storage module 204 to charge and resulting in the rising voltage level across the energy storage module 204, as depicted in graph 502. The energy storage period results in no input power to the DC-AC inverter 210; accordingly, no power is generated by the inverter 102, and the corresponding power output from time $T_1$ to $T_2$ can be seen to be zero.

At time $T_2$, the energy stored in the energy storage module 204 has reached a level sufficient to generate a burst, and the burst current $I_B$ is generated by the inverter 102 as previously described. As the additional burst of power is drawn from the energy storage module 204 during $T_2$ to $T_3$, the voltage level across the energy storage module 204 drops; additionally, a "ripple" voltage can be seen across the energy storage module 204, as depicted in graph 502. During $T_2$ to $T_3$, the inverter 102 generates output power as depicted in graph 504.

At time $T_3$, the energy drawn from the energy storage module 204 has reduced the voltage across the energy storage module 204 to a level requiring the inverter 102 to enter an energy storage period, and the burst current $I_B$ is set to zero. Accordingly, the output power of the inverter 102 falls to zero at time $T_3$. The energy storage module 204 begins to charge again, resulting in the rising voltage level across the energy storage module 204 depicted in graph 502.

At time $T_4$, the energy stored in the energy storage module 204 has again reached a sufficient level to enter a burst period and the burst current $I_B$ is again set to a maximum value. The voltage level across the energy storage module 204 drops as the energy in the energy storage module 204 is utilized, and the inverter 102 again generates an output power.

Figure 6:
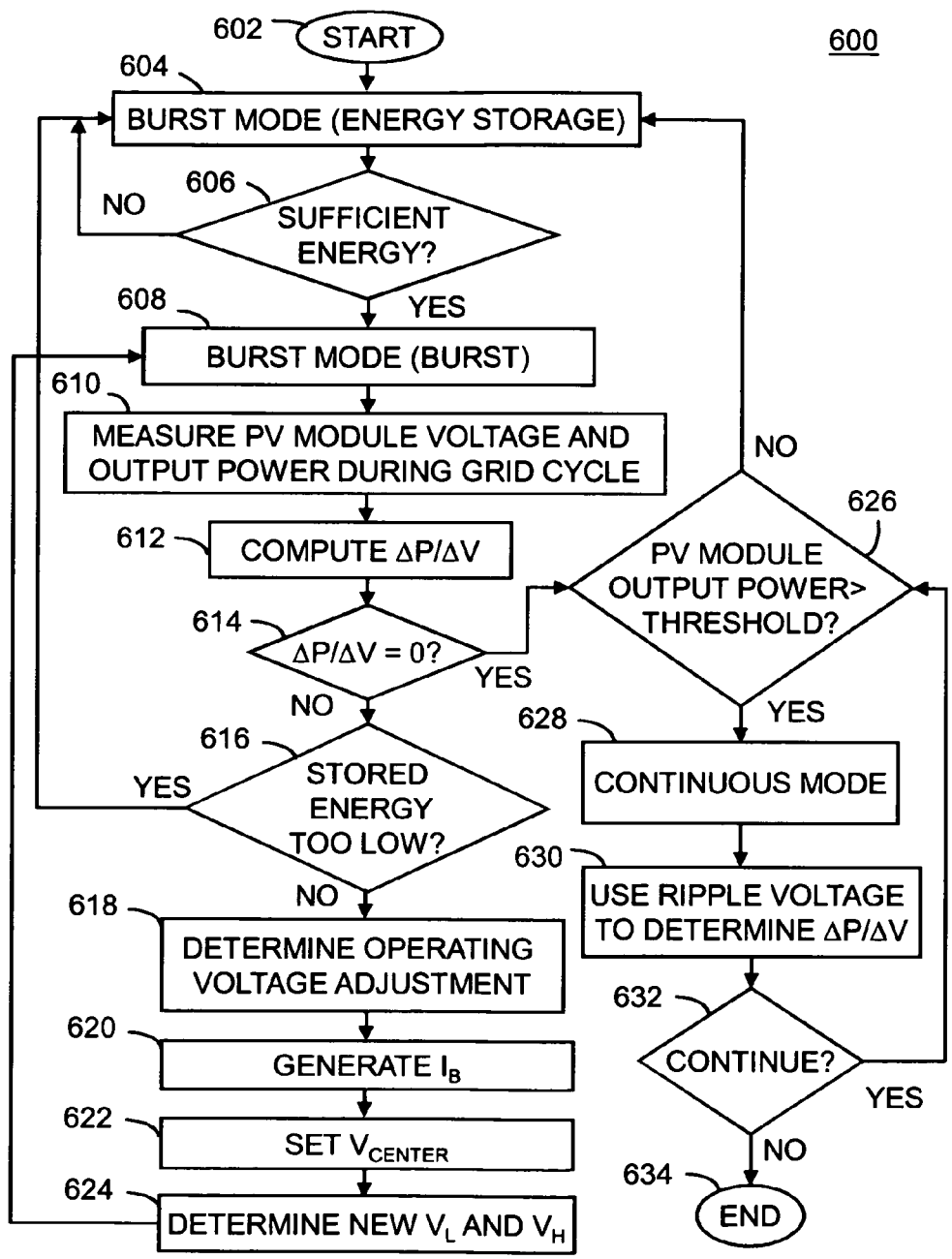
FIG. 6 is a flow diagram of a method 600 for maximum power point tracking (MPPT) with burst mode in accordance with one or more embodiments of the present invention.

FIG. 6 is a flow diagram of a method 600 for maximum power point tracking (MPPT) with burst mode in accordance with one or more embodiments of the present invention. In the method 600, an inverter is coupled to a PV module for converting DC power generated by the PV module to AC power. The inverter is further coupled to a commercial power grid such that the AC power produced is coupled to the commercial power grid in-phase with the commercial AC power. In some embodiments, multiple PV modules may be coupled to a single centralized DC-AC inverter; alternatively, individual PV modules may be coupled to individual DC-AC inverters (e.g., one PV module per DC-AC inverter). In some embodiments, a DC-DC converter may be coupled between the PV module or PV modules and the DC-AC inverter.

The method 600 beings at step 602 and proceeds to step 604. At step 604, the inverter operates in burst mode during an energy storage period The inverter may operate in burst mode due to very low power produced by the PV module, such as during periods of little solar irradiance. During the energy storage period, the inverter stores energy that is produced by the PV module; in some embodiments, an energy storage module, such as a capacitor, is utilized to store the energy.

The method 600 proceeds to step 606, where it is determined whether energy stored in the inverter has reached a level sufficient to enter a burst period and begin generating output power. In some embodiments, such a determination is made based on a voltage across the energy storage module of the inverter satisfying a first threshold. In some embodiments, the first threshold is a high voltage level, $V_H$, where $V_H = V_{center} + \Delta V$, as described above in relation to FIG. 4. $V_{center}$ is an average operating voltage of the PV module, and is equivalent to an average operating voltage of the energy storage module.

If the condition at step 606 is not satisfied, the method 600 returns to step 604. If the condition at step 606 is satisfied, the method 600 proceeds to step 608. At step 608, the inverter enters the burst period. During the burst period, the inverter is driven to produce a burst current, $I_B$, where $I_B$ is greater than the current level that would be normally achieved utilizing only the instantaneous power generated by the PV module. Generating the burst output current $I_B$ draws upon the energy stored in the inverter; in some embodiments, such utilization results in a voltage drop across the energy storage module of the inverter and a corresponding voltage drop across the PV module.

The method 600 proceeds to step 610, where the instantaneous power produced by the PV module and the corresponding PV module operating voltage are measured over one cycle of the commercial power grid. In some embodiments, the commercial power grid operates at 60 Hz and the instantaneous power and operating voltage are measured over 16.67 msec. The method 600 proceeds to step 612, where the change in PV module output power with respect to the change in PV module operating voltage, $\Delta P/\Delta V$, is computed.

The method 600 proceeds to step 614, where a determination is made whether the $\Delta P/\Delta V$ is equal to zero; i.e., whether the PV module is operating at the MPP. If the condition at step 614 is met, the method 600 proceeds to step 626 as described below. If the condition at step 614 is not met, the method 600 proceeds to step 616. At step 616, a determination is made whether the stored energy has been reduced below an acceptable level. In some embodiments, such a determination is made based on a voltage across the energy storage module of the inverter satisfying a second threshold. In some embodiments, the second threshold is a low voltage threshold, $V_L$, where $V_L = V_{center} - \Delta V$, as previously described in relation to FIG. 4. If the condition at step 616 is satisfied, the method 600 returns to step 604 and the inverter again enters an energy storage period to store energy generated by the PV module.

If the condition at step 616 is satisfied, the method 600 proceeds to step 618. At step 618, an adjustment to the PV module operating voltage is determined based on the $\Delta P/\Delta V$, where such adjustment drives the PV module operating voltage toward the MPP operating voltage. In some embodiments, if the $\Delta P/\Delta V$ is positive, the PV module operating voltage must be adjusted positively; if the $\Delta P/\Delta V$ is negative, the PV module operating voltage must be adjusted negatively. The required adjustment to the PV module operating voltage defines a new desired PV module operating voltage.

At step 620, the inverter is driven to generate a burst mode current, $I_B$, where $I_B$ results in driving the PV module to the new desired operating voltage. At step 622, $V_{center}$ is set to the new desired operating voltage, and at step 624, new high and low voltage thresholds, $V_H$ and $V_L$, are determined based on the new $V_{center}$. The method 600 returns to step 608, where the inverter continues the burst period.

If it has been determined at step 614 that the $\Delta P/\Delta V$ is zero, i.e., that the PV module is operating at the MPP, the method 600 proceeds to step 626. At step 626, a determination is made whether the PV module output power satisfies a power threshold. If the PV module output power does not satisfy the power threshold, the inverter will suffer from a low efficiency and therefore requires continued operation in burst mode to improve the efficiency. If the PV module is producing power at a sufficient level, burst mode is no longer required. In some embodiments, a power threshold of 30% of the power rating of the PV module is utilized.

If the condition at step 626 is not satisfied, the method 600 returns to step 604 for continued operation in burst mode. If the condition at step 626 is satisfied, the method 600 proceeds to step 628. At step 628, the inverter switches from burst mode and operates in a steady-state, or continuous, mode. During such operation, the inverter is driven to produce an output current, $I_{req}$.

At step 630, a ripple voltage across the energy storage module provides a corresponding voltage "sweeping" across the PV module. Such a sweeping provides an opportunity to compute the $\Delta P/\Delta V$ during each cycle of the commercial power grid and to adjust the $I_{req}$ accordingly to bias the PV module at the MPP for continued MPPT operation. At step 632, a determination is made whether the operation of the inverter should be continued. If the condition at step 632 is satisfied, the method 600 returns to step 626; if the condition at step 632 is not satisfied, the method 600 proceeds to step 634 where it ends.

While the foregoing is directed to embodiments of the present invention, other and further embodiments of the invention may be devised without departing from the basic scope thereof, and the scope thereof is determined by the claims that follow.

The invention claimed is:

1. An apparatus for converting DC input power to AC output power, comprising:
    an energy storage module; and
    a burst mode controller for (i) causing energy to be stored in the energy storage module during at least one storage period and the energy to be drawn from the energy storage module during at least one burst period, wherein the AC output power is greater than the DC input power during the at least one burst period, and (ii) employing a maximum power point tracking (MPPT) technique for operating a device providing the DC input power proximate a maximum power point (MPP).

2. The apparatus of claim 1, wherein the MPPT technique comprises computing a change in output power from the device with respect to a change in operating voltage of the device and utilizing a result of the computing to drive the device to the MPP.

3. The apparatus of claim 2, wherein the result of the computing indicates an AC current output must be decreased to reach the MPP when the result is positive and the AC current output must be increased to reach the MPP when the result is negative.

4. The apparatus of claim 2, wherein the burst mode controller comprises an MPPT module for receiving measures of an output current of the device and the operating voltage and performing the computing in accordance with the measures.

5. The apparatus of claim 4, wherein the at least one storage period begins when a voltage of the energy storage module satisfies a first threshold, and wherein the at least one burst period begins when the voltage satisfies a second threshold.

6. The apparatus of claim 5, wherein the burst mode controller determines the first and the second thresholds in accordance with the measures.

7. The apparatus of claim 6, further comprising a burst activation controller for determining when the first and second thresholds are satisfied.

8. The apparatus of claim 1, further comprising a burst current controller, wherein the burst current controller causes the AC output power to be greater than the DC input power.

9. The apparatus of claim 1, wherein the at least one storage period and the at least one burst period occur when the DC input power satisfies an operating power threshold.

10. The apparatus of claim 9, wherein the operating power threshold is 30% of a power rating of the device.

11. The apparatus of claim 1, wherein the energy storage module comprises at least one capacitor.

12. A method for converting DC input power to AC output power, comprising:
    storing energy in an energy storage module during at least one storage period;
    drawing energy from the energy storage module during at least one burst period, wherein the AC output power is greater than the DC input power during the at least one burst period; and
    employing a maximum power point tracking (MPPT) technique for operating a device providing the DC input power proximate a maximum power point (MPP).

13. The method of claim 12, wherein the MMPT technique comprises computing a change in output power from the device with respect to a change in operating voltage of the device and utilizing a result of the computing to drive the device to the MPP.

14. The method of claim 13 wherein the result of the computing indicates an AC current output must be decreased to reach the MPP when the result is positive and the AC current output must be increased to reach the MPP when the result is negative.

15. The method of claim 13, further comprising receiving measures of an output current of the device and the operating voltage and performing the computing in accordance with the measures.

16. The method of claim 15, wherein the at least one storage period begins when a voltage of the energy storage module satisfies a first threshold, and wherein the at least one burst period begins when the voltage satisfies a second threshold.

17. The method of claim 16, further comprising determining the first and the second thresholds in accordance with the measures.

18. The method of claim 12, wherein the storing energy and the drawing energy occur when the DC input power satisfies an operating power threshold.

19. The method of claim 18, wherein the operating power threshold is 30% of a power rating of the device.

20. A system for power conversion, comprising:
    at least one photovoltaic (PV) module;
    at least one DC to AC inverter, wherein the at least one DC to AC inverter converts DC input power to AC output power;
    at least one energy storage module; and
    at least one burst mode controller for (i) causing energy to be stored in the at least one energy storage module during at least one storage period and the energy to be drawn from the at least one energy storage module during at least one burst period, wherein the AC output power of the at least one DC to AC inverter is greater than the DC input power of the at least one DC to AC inverter during the at least one burst period, and (ii) employing a maximum power point tracking (MPPT) technique for operating the at least one PV module proximate a maximum power point (MPP).

* * * * *